US012611803B2

(12) United States Patent
Park et al.

(10) Patent No.: US 12,611,803 B2
(45) Date of Patent: Apr. 28, 2026

(54) PLASTIC COMPOSITE MATERIAL PARTS FORMING APPARATUS

(71) Applicants: Hyundai Motor Company, Seoul (KR); Kia Corporation, Seoul (KR); KOLON SPACEWORKS CO., LTD., Gyeongsangnam-do (KR); PUNGKANG Co., Ltd, Hwaseong-si (KR)

(72) Inventors: Youjin Park, Hwaseong-si (KR); Jae Young Lee, Hwaseong-si (KR); Jae Kuk Park, Seoul (KR); Chang Hee Lee, Seoul (KR); Min Jun Kim, Seoul (KR); Jin Yong Kim, Seoul (KR); Kwang Hee Lee, Seoul (KR); Sung Muk Kang, Seoul (KR); Se Jin Park, Anyang-si (KR)

(73) Assignees: Hyundai Motor Company, Seoul (KR); Kia Corporation, Seoul (KR); Kolon Spaceworks Co., Ltd., Seoul (KR); Pungkang Co., Ltd., Hwaseong-si (KR)

( * ) Notice: Subject to any disclaimer, the term of this patent is extended or adjusted under 35 U.S.C. 154(b) by 96 days.

(21) Appl. No.: 18/899,302

(22) Filed: Sep. 27, 2024

(65) Prior Publication Data

US 2025/0242523 A1 Jul. 31, 2025

(30) Foreign Application Priority Data

Jan. 30, 2024 (KR) ........................ 10-2024-0014036

(51) Int. Cl.
*B29C 43/18* (2006.01)
*B29C 43/36* (2006.01)
*B29L 31/30* (2006.01)

(52) U.S. Cl.
CPC ........ *B29C 43/18* (2013.01); *B29C 2043/189* (2013.01); *B29C 2043/3602* (2013.01); *B29C 2043/3665* (2013.01); *B29L 2031/3005* (2013.01)

(58) Field of Classification Search
CPC .............. B29C 43/18; B29C 2043/189; B29C 2043/3602; B29C 2043/3665; B29C 2043/3211; B29C 70/06; B29C 70/42; B29C 70/68
See application file for complete search history.

(56) References Cited

U.S. PATENT DOCUMENTS

2022/0396041 A1* 12/2022 Watanabe .............. B21D 37/16
2024/0269946 A1* 8/2024 Tsunemasu ........... F16H 57/032

\* cited by examiner

*Primary Examiner* — Galen H Hauth
*Assistant Examiner* — Mohamed K Ahmed Ali
(74) *Attorney, Agent, or Firm* — Slater Matsil, LLP

(57) ABSTRACT

An embodiment plastic composite material parts forming apparatus includes a press mold, a composite material forming source disposed on the press mold and configured to be pressed into a set shape by the press mold, a mold pin assembly mounted on the press mold, and an insert nut detachably attached to the mold pin assembly to be inserted into the composite material forming source and having a head flange portion configured to face-contact the mold pin assembly.

18 Claims, 9 Drawing Sheets

100

PLASTIC COMPOSITE MATERIAL PARTS FORMING APPARATUS

CROSS-REFERENCE TO RELATED APPLICATIONS

This application claims the benefit of Korean Patent Application No. 10-2024-0014036, filed on Jan. 30, 2024, which application is hereby incorporated herein by reference.

TECHNICAL FIELD

The disclosure relates to a plastic composite material parts forming apparatus.

BACKGROUND

Generally, a plurality of panels are assembled into a vehicle body. Examples of panels include side outer panels, roof panels, and hood panels. Panels are usually manufactured by forming a steel blank with a press mold.

However, in the case of the forming method, the development period for the press mold is long and development costs may also be excessive. Furthermore, a painting process is required to paint press-formed steel panels.

Accordingly, recently, forming technology for plastic composite material panels that may reduce the weight of vehicles and do not require painting has been introduced.

Plastic composite material panels may be manufactured by forming a composite material forming source into a set shape through a press mold.

The plastic composite material panels as described above may be assembled with related parts (for example, a vehicle body) through fastening members (commonly referred to as 'hardware' by those skilled in the art) including a combination of bolts and nuts.

Furthermore, the plastic composite material panels may, in an example, be fastened to related components by nuts (e.g., insert nuts) that are insert-formed by a press mold.

The nut is fixed to a mold pin of the press mold and may be inserted into and fixed to the composite material forming source during press forming of the composite material forming source.

However, if the nut is not in close contact with the mold pin or there is no sealing between the mold pin and the nut, the composite material forming source may flow into the inside of the nut and be cured. This may cause quality problems in plastic composite material panels.

To improve this, the related art applies a sealing material, for example, an O-ring, between the mold pin and the nut.

However, in the case of repeated forming of a plastic composite material panel, it may be necessary to replace a sealing material or remove the composite material forming source that has entered the inside of the nut due to the loose sealing material, which may degrade the operability of equipment. In addition, quality problems, such as the sealing material becoming stuck inside the nut, may arise.

The above information disclosed in this background section is only for enhancement of understanding of the background of embodiments of the disclosure, and therefore it may contain information that does not form the already known related art.

SUMMARY

The disclosure relates to a plastic composite material parts forming apparatus. Particular embodiments relate to a plastic composite material parts forming apparatus for forming plastic composite material parts, such as vehicle body panels.

Embodiments of the disclosure provide a plastic composite material parts forming apparatus capable of eliminating an O-ring and solving the problem that a composite material forming source is stuck in a nut.

According to an exemplary embodiment, a plastic composite material parts forming apparatus for forming a composite material forming source into a set shape by a press mold includes a mold pin assembly mounted on the press mold and an insert nut detachably attached to the mold pin assembly to be inserted into the composite material forming source and having a head flange portion capable of face-contacting the mold pin assembly.

In addition, according to an exemplary embodiment, the mold pin assembly may be mounted on an upper mold of the press mold.

In addition, according to an exemplary embodiment, the head flange portion may face-contact the mold pin assembly by magnetic force.

In addition, according to an exemplary embodiment, the mold pin assembly may include a core member coupled to the press mold, an insert pin extending downwardly from the core member to be fitted into the insert nut, and a magnet member coupled to a lower surface of the core member with the insert pin at a center and having a flange bearing surface capable of face-contacting the head flange portion of a circular flange type.

In addition, according to an exemplary embodiment, the magnet member may be provided in a donut shape with a pin coupling hole capable of being coupled to the insert pin formed in a center.

In addition, according to an exemplary embodiment, the insert nut may include a nut body portion having an outer diameter smaller than an outer diameter of the head flange portion and extending downwardly from a lower surface of the head flange portion.

In addition, according to an exemplary embodiment, the outer diameter D1 of the head flange portion may be equal to or greater than an outer diameter D2 of the magnet member.

In addition, according to an exemplary embodiment, the outer diameter D1 of the head flange portion, an outer diameter Do of the nut body portion, and a maximum forging processing value (2.2 Do) of the head flange portion may satisfy D1=2.2 Do.

In addition, according to an exemplary embodiment, a connection angle of the lower surface of the head flange and the nut body portion may satisfy 10 to 35°.

In addition, according to an exemplary embodiment, the insert nut may further include a plurality of barrier grooves formed on an upper surface of the head flange portion of a circular flange type.

In addition, according to an exemplary embodiment, the barrier grooves may be disposed from an inner edge to an outer edge of the head flange portion and may be formed in a concentric circle shape.

In addition, according to an exemplary embodiment, the barrier grooves may be disposed from the inner edge to the outer edge of the head flange portion and may be formed in a wave shape in a radial direction.

In addition, according to an exemplary embodiment, the plastic composite material parts forming apparatus may form a plastic composite material panel into which the insert nut is inserted.

In addition, according to an exemplary embodiment, the plastic composite material panel may be a hood panel.

According to the plastic composite material parts forming apparatus according to an exemplary embodiment of the disclosure, by blocking the composite material forming source flowing into the bearing surface and inside of the insert nut, the problem that the composite material forming source is stuck in the nut may be solved In addition, according to the plastic composite material parts forming apparatus according to an exemplary embodiment of the disclosure, an O-ring such as that in the related art may be eliminated.

In addition, the effects that may be obtained or expected due to the exemplary embodiments of the disclosure will be disclosed directly or implicitly in the detailed description of the exemplary embodiments of the disclosure. That is, various effects expected according to exemplary embodiments of the disclosure will be disclosed in the detailed description to be described later.

BRIEF DESCRIPTION OF THE DRAWINGS

The drawings are used to be referred to in describing exemplary embodiments of the disclosure, so a technical concept of the disclosure should not be meant to restrict the disclosure to the accompanying drawings.

It is to be understood that the drawings referenced above are not necessarily drawn to scale, but rather present a rather simplified representation of various preferred features illustrating the basic principles of embodiments of the disclosure. Certain design features of embodiments of the disclosure, including, for example, particular dimensions, orientations, locations, and shapes, will be determined in part by the particular intended application and environment of use.

DETAILED DESCRIPTION OF ILLUSTRATIVE EMBODIMENTS

It is to be understood that the drawings referenced above are not necessarily drawn to scale, but rather present a rather simplified representation of various preferred features illustrating the basic principles of embodiments of the disclosure. As those skilled in the art would realize, the described exemplary embodiments may be modified in various different ways, all without departing from the spirit or scope of the disclosure.

The terminology used herein is for the purpose of describing specific exemplary embodiments only and is not intended to limit the disclosure. As used herein, the singular forms are intended to include the plural forms as well, unless the context clearly indicates otherwise.

As used herein, it should be understood that the terms "include" and/or "including" refer to the presence of specified features, integers, steps, operations, elements, and/or components, but they do not exclude the presence or addition of one or more other features, integers, steps, operations, components, and/or groups thereof.

As used herein, the term "and/or" includes any one or all combinations of the associated listed items.

As used herein, the term "coupled" denotes a physical relationship between two components directly connected to each other or indirectly connected through one or more intervening components.

The term "vehicle," "vehicular," "automobile," or other similar term as used herein includes passenger automobiles including passenger vehicles, sport utility vehicles (SUVs), buses, trucks, and various commercial vehicles and includes hybrid vehicles, electric vehicles, hybrid electric vehicles, electric vehicle-based purpose built vehicles (PBVs), hydrogen-powered vehicles, and other alternative fuel vehicles (e.g., fuels derived from resources other than petroleum).

Hereinafter, exemplary embodiments of the disclosure are described in detail with reference to the accompanying drawings.

Figure 1:
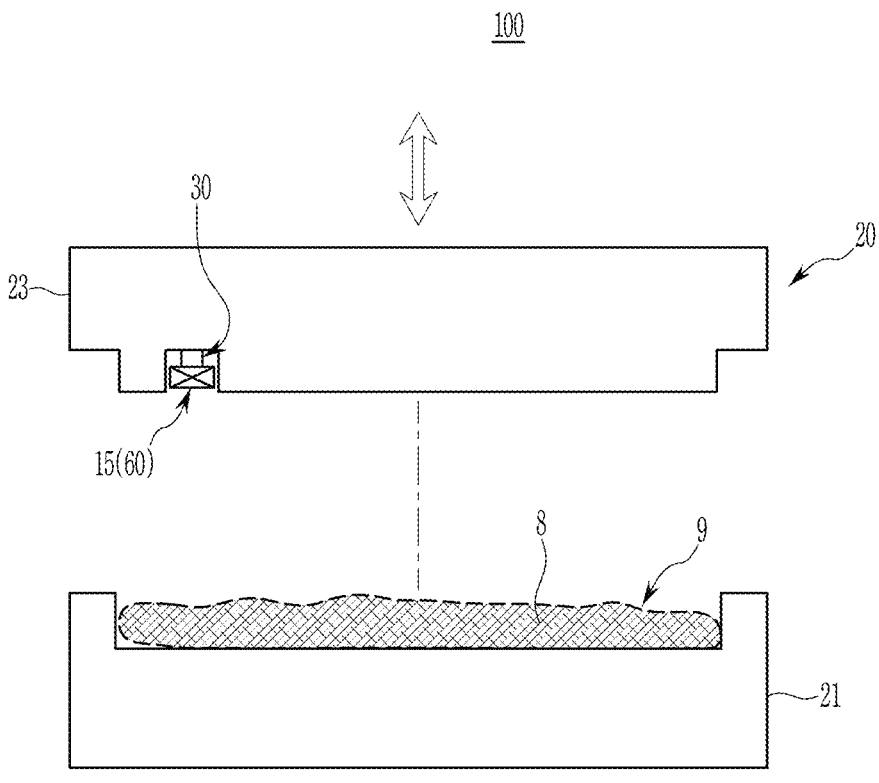
FIG. 1 is a diagram schematically illustrating a plastic composite material parts forming apparatus according to an exemplary embodiment of the disclosure.
Figure 2:
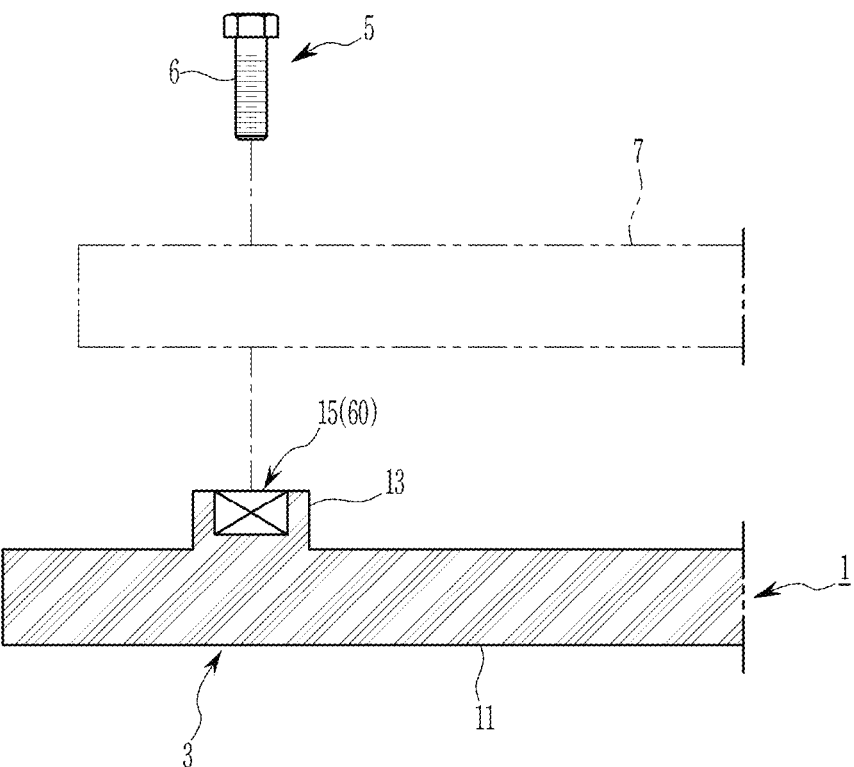
FIG. 2 is a diagram schematically illustrating a plastic composite material panel manufactured by a plastic composite material parts forming apparatus according to an exemplary embodiment of the disclosure.

FIG. 1 is a diagram schematically illustrating a plastic composite material parts forming apparatus according to an exemplary embodiment of the disclosure, and FIG. 2 is a diagram schematically illustrating a plastic composite material panel manufactured by a plastic composite material parts forming apparatus according to an exemplary embodiment of the disclosure.

Referring to FIGS. 1 and 2, a plastic composite material parts forming apparatus 100 according to an exemplary embodiment of the disclosure may be applied to, for example, a process of manufacturing a plastic composite material panel 1.

In an example, the plastic composite material panel 1 may include a hood panel 3 of a vehicle.

The plastic composite material panel 1 may be fastened to a vehicle body 7 by a fastening member 5.

Referring to FIGS. 1 and 2, the plastic composite material parts forming apparatus 100 according to an exemplary embodiment of the disclosure press-forms a composite material forming source 9 into a shape set by a press mold 20 and manufactures the plastic composite material panel 1.

Here, the composite material forming source 9 may be a thermosetting material including a fiber material 8 and a thermosetting resin. The fiber material 8 may include, for example, one or more of carbon fiber, glass fiber, and aramid fiber.

Also, the composite material forming source 9 may include a polyurethane compound. The composite material forming source 9 is self-evident to those skilled in the art, and a detailed description thereof is omitted.

Referring to FIGS. 1 and 2, the plastic composite material panel 1 manufactured by the plastic composite material parts forming apparatus 100 according to an exemplary embodiment of the disclosure includes a forming body portion 11 and at least one boss portion 13.

The forming body portion 11 may be formed of the composite material forming source 9 and may be formed into a shape set by the press mold 20. In an example, the forming body portion 11 may be provided as a panel body portion (e.g., a plate portion) of the hood panel 3.

In addition, the at least one boss portion 13 may extend from the forming body portion 11 to a set height by the press mold 20 and may be formed together with the forming body portion 11.

Here, an insert 15 is inserted into the at least one boss portion 13. The insert 15 may be fastened with the fastening member 5, for example, a bolt 6.

The insert 15 may be inserted into at least one boss portion 13 when the forming body portion 11 and the at least one boss portion 13 are formed using the press mold 20.

Furthermore, the insert 15 may be mounted on the press mold 20. The insert 15 may be inserted into at least one boss portion 13 and fixed to at least one boss portion 13 when the press mold 20 is operated.

In this specification, an "upper end portion," "upper portion," "top," or "upper surface" of a component refers to an end portion, portion, end, or surface of the component that is present relatively on the upper side in the drawings, and a "lower end portion," "lower portion," "bottom," or "lower surface" of a component refers to an end portion, portion, end, or surface of the component that is present relatively on the lower side in the drawings.

In addition, in this specification, an end of a component (e.g., one end, the other end, both ends, etc.) refers to the end of the component in any one direction, and an end portion of a component (e.g., one end portion, the other end portion, both end portions, a front end portion, a rear end portion, etc.) refers to a certain portion of the component including the end.

Meanwhile, referring to FIGS. 1 and 2, the plastic composite material parts forming apparatus 100 according to an exemplary embodiment of the disclosure insert-forms the insert 15 into the at least one boss portion 13 when forming the composite material forming source 9 by the press mold 20.

To this end, the plastic composite material parts forming apparatus 100 according to an exemplary embodiment of the disclosure includes a mold pin assembly 30 mounted on the press mold 20 and an insert nut 60 as the insert 15 that is detachable from the mold pin assembly 30.

Here, the press mold 20 includes a lower mold 21 and an upper mold 23.

The lower mold 21 is fixed to the floor of a process workshop. The upper mold 23 is installed to be movable in a vertical direction corresponding to the lower mold 21.

The upper mold 23 may press a gel-type composite material forming source 9 sprayed on the lower mold 21 and may form the plastic composite material panel 1.

In an exemplary embodiment of the disclosure, the mold pin assembly 30 is mounted on the upper mold 23. The mold pin assembly 30 is configured to fix the insert nut 60 to be inserted into the composite material forming source 9 when the upper mold 23 is operated.

To elaborate, the mold pin assembly 30 may insert the insert nut 60 into the at least one boss portion 13 by operating the upper mold 23 while the insert nut 60 is fixed.

In addition, the mold pin assembly 30 may be separated from the insert nut 60 according to the operation of the upper mold 23 in a state in which the insert nut 60 is fixed to the at least one boss portion 13 due to curing of the composite material forming source 9.

Figure 3:
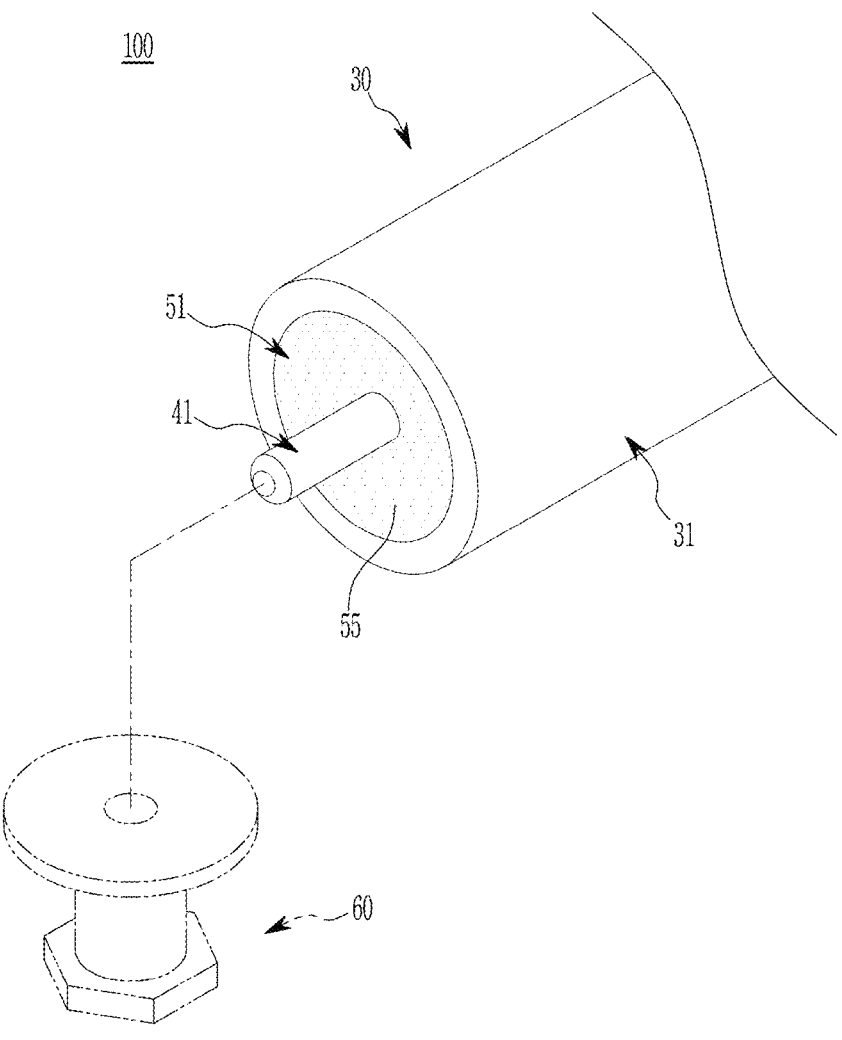
FIG. 3 is a combined perspective view illustrating a mold pin assembly applied to a plastic composite material parts forming apparatus according to an exemplary embodiment of the disclosure.
Figure 4:
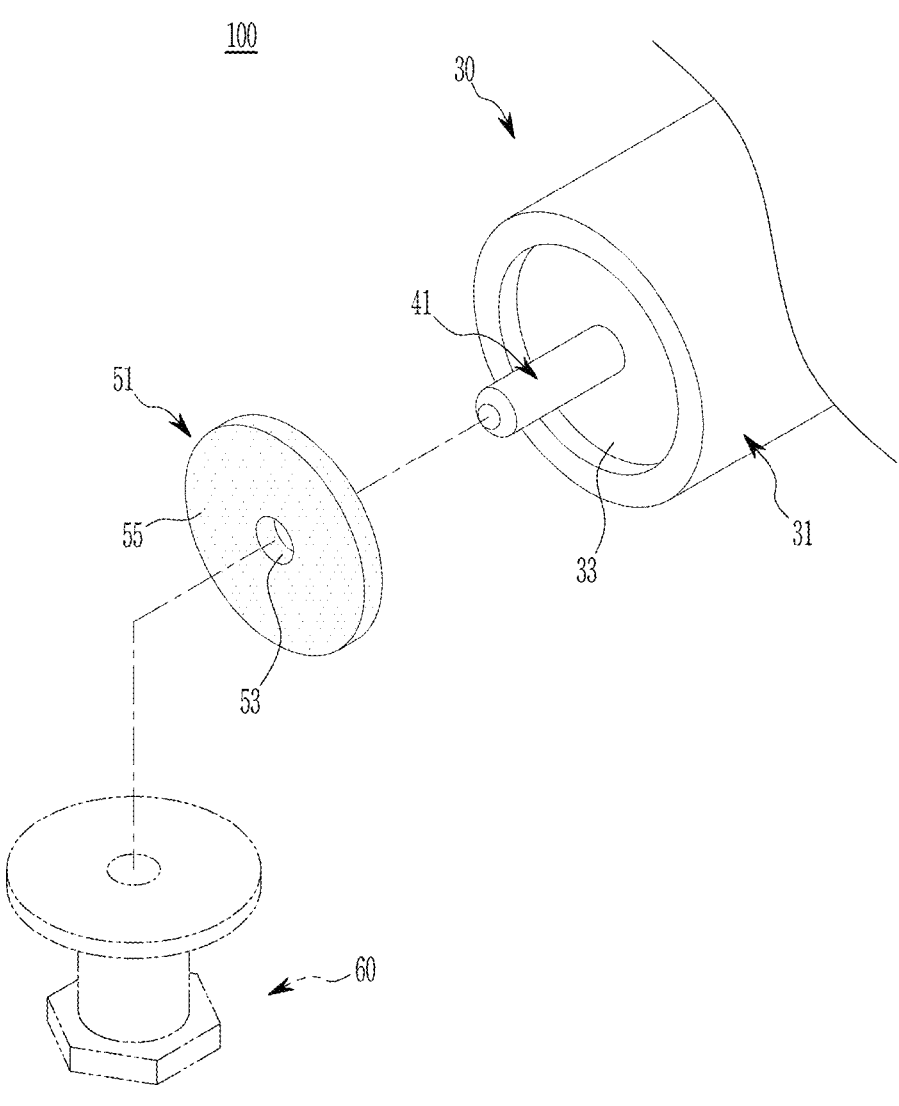
FIG. 4 is an exploded perspective view illustrating a mold pin assembly applied to a plastic composite material parts forming apparatus according to an exemplary embodiment of the disclosure.
Figure 5:
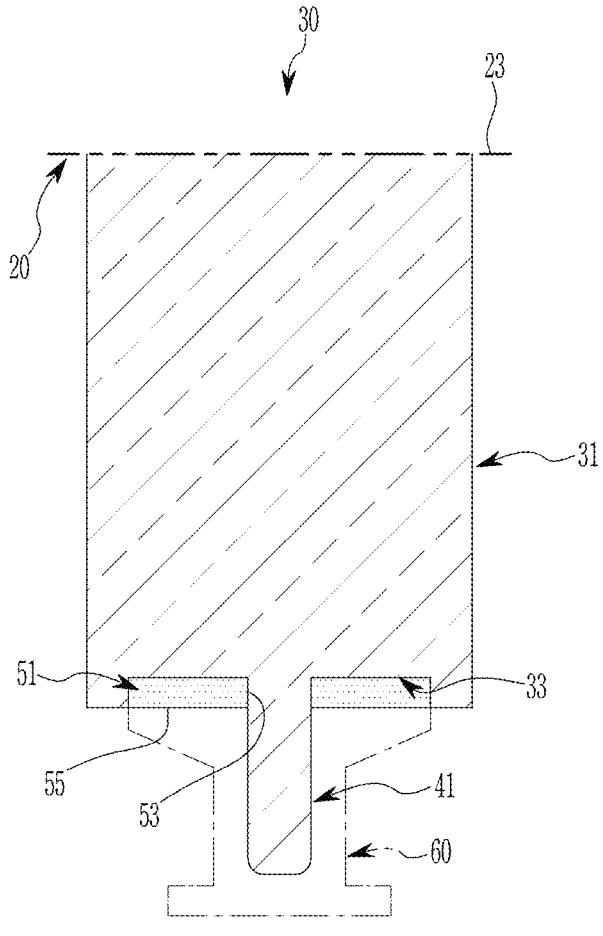
FIG. 5 is a cross-sectional view illustrating a mold pin assembly applied to a plastic composite material parts forming apparatus according to an exemplary embodiment of the disclosure.

FIG. 3 is a combined perspective view illustrating a mold pin assembly applied to a plastic composite material parts forming apparatus according to an exemplary embodiment of the disclosure, FIG. 4 is an exploded perspective view illustrating a mold pin assembly applied to a plastic composite material parts forming apparatus according to an exemplary embodiment of the disclosure, and FIG. 5 is a cross-sectional view illustrating a mold pin assembly applied to a plastic composite material parts forming apparatus according to an exemplary embodiment of the disclosure.

Referring to FIGS. 3 to 5, the mold pin assembly 30 according to an exemplary embodiment of the disclosure includes a core member 31, an insert pin 41, and a magnet member 51.

The core member 31 is coupled to the upper mold 23 of the press mold 20. In an example, the core member 31 is provided as a cylindrical block and is disposed in the vertical direction. The core member 31 may be coupled to the upper mold 23 by a bolting method, a welding method, or an interference fitting method.

The insert pin 41 is provided in the shape of a circular pillar to be inserted into the insert nut 60 in the vertical direction. The insert pin 41 has an outer diameter smaller than that of the core member 31 and extends downwardly from a lower portion of the core member 31.

In an example, the insert pin 41 may be integrally connected to the lower portion of the core member 31, as shown in the drawing. In another example, the insert pin 41 may be coupled to the lower portion of the core member 31 by a bolting method, a welding method, or an interference fitting method.

In addition, the magnet member 51 is configured to fix the insert nut 60 inserted into the insert pin 41 by magnetic force.

The magnet member 51 is coupled to a lower surface of the core member 31 with the insert pin 41 at the center.

In an example, the magnet member 51 may be provided in a donut shape with a pin coupling hole 53 that may be coupled to the insert pin 41 formed in the center.

The magnet member 51 may be coupled to a magnet coupling groove 33 formed on a lower surface of the core member 31. Here, the magnet member 51 may be coupled to the magnet coupling groove 33 using an interference fitting method or a wedge method.

The other components of the magnet member 51 described above are described in detail below along with the configuration of the insert nut 60.

Figure 6:
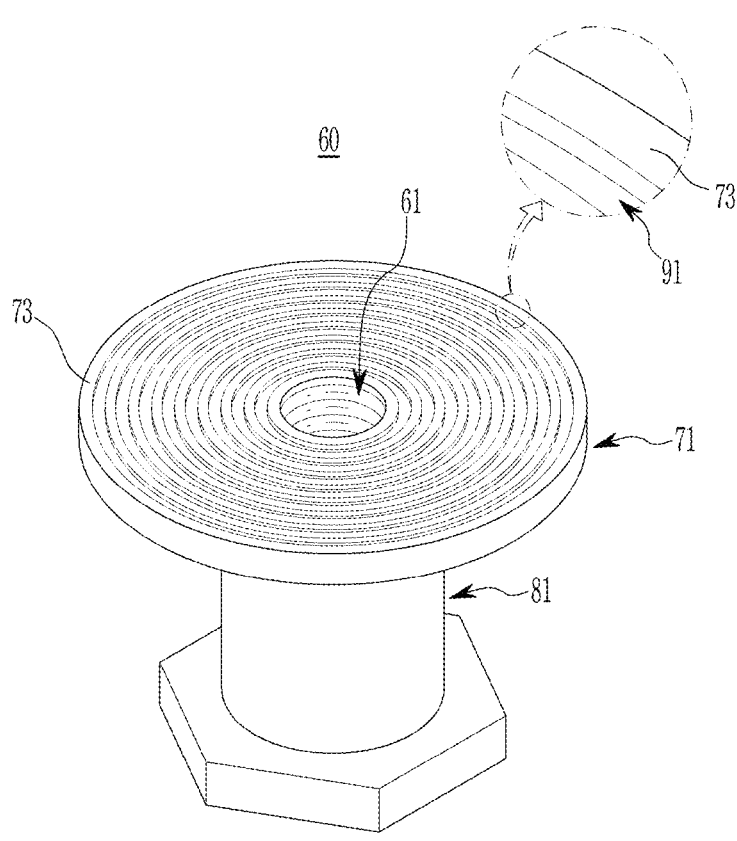
FIG. 6 is a perspective view illustrating an insert nut applied to a plastic composite material parts forming apparatus according to an exemplary embodiment of the disclosure.
Figure 7:
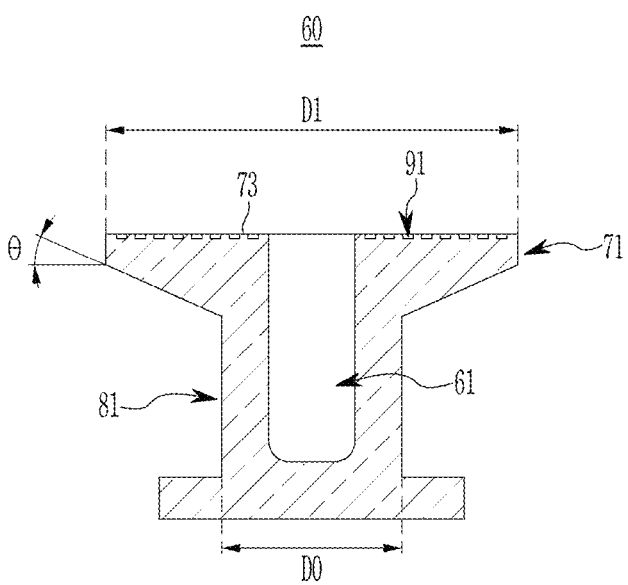
FIG. 7 is a cross-sectional view illustrating an insert nut applied to a plastic composite material parts forming apparatus according to an exemplary embodiment of the disclosure.
Figure 8:
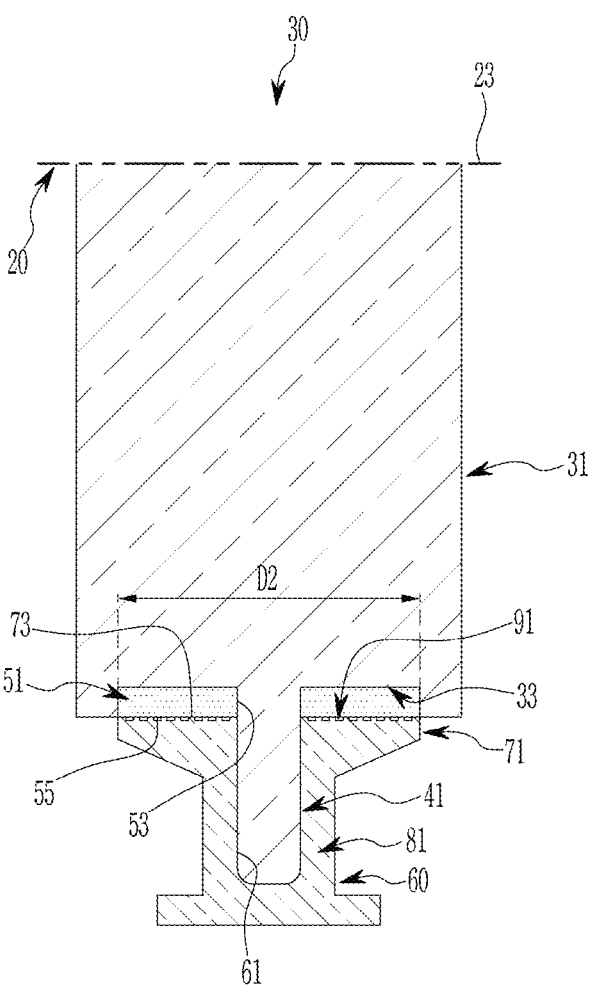
FIG. 8 is a cross-sectional view illustrating a coupling structure of an insert nut and a mold pin assembly applied to a plastic composite material parts forming apparatus according to an exemplary embodiment of the disclosure.

FIG. 6 is a perspective view illustrating an insert nut applied to a plastic composite material parts forming apparatus according to an exemplary embodiment of the disclosure, FIG. 7 is a cross-sectional view illustrating an insert nut applied to a plastic composite material parts forming apparatus according to an exemplary embodiment of the disclosure, and FIG. 8 is a cross-sectional view illustrating a coupling structure of an insert nut and a mold pin assembly applied to a plastic composite material parts forming apparatus according to an exemplary embodiment of the disclosure.

Referring to FIGS. 3 to 8, the insert nut 60 according to an exemplary embodiment of the disclosure may be inserted into the at least one boss portion 13 (hereinafter, see FIG. 2) when the composite material forming source 9 (hereinafter, see FIG. 1) is formed using the press mold 20 (hereinafter, see FIG. 1). The insert nut 60 may be attached to or detached from the mold pin assembly 30.

The insert nut 60 may be fitted into the insert pin 41 of the mold pin assembly 30 in the vertical direction and may be magnetically coupled to the magnet member 51. The insert nut 60 may be provided in the form of a cap nut having a fastening groove 61 that is open at the top and closed at the bottom.

This insert nut 60 includes a head flange portion 71, a nut body portion 81, and a plurality of barrier grooves 91.

The head flange portion 71 is formed in an upper portion of the insert nut 60. The head flange portion 71 is formed as a circular flange type extending radially outward from an upper edge of the fastening groove 61.

The head flange portion 71 is provided to magnetically face contact (or face to face contact) a lower surface of the magnet member 51 of the mold pin assembly 30.

To this end, the upper surface of the head flange portion 71 may be formed as a magnet bearing surface 73 having a predetermined area that may face-contact the lower surface of the magnet member 51. In addition, a lower surface of the magnet member 51 may be formed as a flange bearing surface 55 having a predetermined area that may face-contact the magnet bearing surface 73 of the head flange portion 71.

The nut body portion 81 has an outer diameter smaller than that of the head flange portion 71 and extends downwardly from a lower surface of the head flange portion 71.

Here, referring to a structure of the insert nut 60 and a coupling structure of the head flange portion 71 of the insert nut 60 and the magnet member 51 as described above, the head flange portion 71 has a size allowing forging.

To elaborate, an outer diameter D1 (hereinafter, see FIG. 7) of the head flange portion 71 is equal to an outer diameter D2 (hereinafter, see FIG. 8) of the magnet member 51 or greater than the outer diameter D2 of the magnet member 51.

Furthermore, the outer diameter D1 of the head flange portion 71, an outer diameter Do (hereinafter, see FIG. 7) of the nut body portion 81, and a maximum forging processing value (2.2 Do) of the head flange portion 71 satisfy D1=2.2 Do. The maximum forging processing value may be defined as a limit value of material bursting during offset processing to increase a diameter of a processing material.

Accordingly, the magnet bearing surface 73 of the head flange portion 71 as described above may be magnetically in face contact with the flange bearing surface 55, while covering the entire flange bearing surface 55 of the magnet member 51.

In addition, as the area of the flange bearing surface 55 increases so that the flange bearing surface 55 of the magnet member 51 and the magnet bearing surface 73 of the head flange portion 71 may be in face contact, the magnet member 51 may fix the head flange portion 71 with increased magnetic force.

Accordingly, coupling force (or adhesion force) between the mold pin assembly 30 and the insert nut 60 may be increased due to the increased magnetic force of the magnet member 51.

As a result, the flange bearing surface 55 and the magnet bearing surface 73 that are in face-contact with each other may primarily block the composite material forming source 9 flowing into the insert nut 60.

Furthermore, in the insert nut 60 as described above, a connection angle θ (hereinafter, see FIG. 7) between a lower surface of the head flange portion 71 and the nut body portion 81 satisfy 10 to 35°.

The connection angle θ of the head flange portion 71 and the nut body portion 81 may be defined as an angle at which the composite material forming source 9 flows smoothly when the insert nut 60 is inserted into the composite material forming source 9.

Also, the barrier grooves 91 are formed on the magnet bearing surface 73 of the head flange portion 71.

The barrier grooves 91 are configured to control a flow direction of the composite material forming source 9 around the insert nut 60 when the insert nut 60 is inserted into the composite material forming source 9.

That is, the barrier grooves 91 may be configured to secondarily block the composite material forming source 9 from flowing into the insert nut 60 through a space between the flange bearing surface 55 of the magnet member 51 and the magnet bearing surface 73 of the head flange portion 71 during insert forming of the insert nut 60.

In an example, these barrier grooves 91 are arranged from an inner edge to the outer edge of the magnet bearing surface 73 of the head flange portion 71 and are formed in a concentric circle shape.

Figure 9:
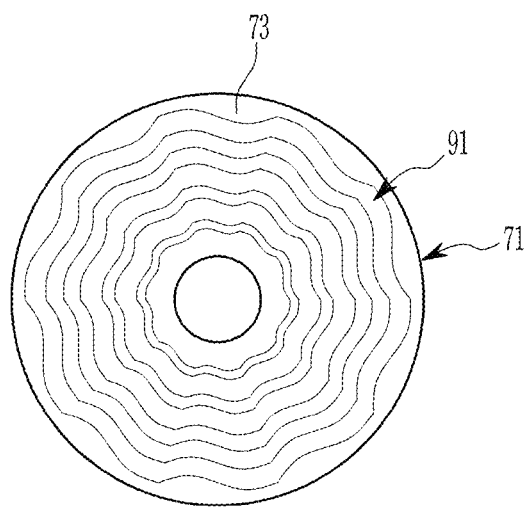
FIG. 9 is a plan view illustrating a modified example of a barrier groove of an insert nut applied to a plastic composite material parts forming apparatus according to an exemplary embodiment of the disclosure.

In another example, the barrier groove 91 is disposed from an inner edge to an outer edge of the magnet bearing surface 73 of the head flange portion 71 and may have a wave shape in the radial direction, as shown in FIG. 9.

Hereinafter, the operation of the plastic composite material parts forming apparatus 100 configured as described above is described in detail with reference to FIGS. 1 to 9.

First, in an exemplary embodiment of the disclosure, the composite material forming source 9 in the form of a gel is sprayed on the lower mold 21 of the press mold 20.

At this time, the upper mold 23 of the press mold 20 is moved upwardly. In addition, the mold pin assembly 30 is installed on the upper mold 23, and the insert nut 60 formed of steel is fixed to the mold pin assembly 30.

The mold pin assembly 30 includes a core member 31, an insert pin 41, and a magnet member 51. The insert nut 60 includes a head flange portion 71.

The insert nut 60 is fitted into the insert pin 41 through the fastening groove 61 in the vertical direction. Then, the magnet bearing surface 73 of the head flange portion 71 magnetically face-contacts the flange bearing surface 55 of the magnet member 51.

Since the outer diameter D1 of the head flange portion 71 is equal to or greater than the outer diameter D2 of the magnet member 51, the magnet bearing surface 73 may be coupled (or fixed) to the flange bearing surface 55 by magnetic force, while entirely covering the flange bearing surface 55.

Here, the magnet member 51 is coupled to the head flange portion 71 with strong magnetic force due to the increased area of the flange bearing surface 55. Accordingly, the magnet bearing surface 73 of the head flange portion 71 may face-contact the flange bearing surface 55 of the magnet member 51 with strong adhesion.

In this state, the upper mold 23 of the press mold 20 moves downwardly and joins the lower mold 21. Then, the forming body portion 11 and the at least one boss portion 13 having a set shape are formed by the flow of the composite material forming source 9.

In this process, the insert nut 60 is inserted into the at least one boss portion 13.

At this time, since the flange bearing surface 55 of the magnet member 51 and the magnet bearing surface 73 of the head flange portion 71 are in face-contact with strong adhesion, even if external force acts on the insert nut 60, the insert nut 60 may not be shaken or twisted in the mold pin assembly 30 and may be easily inserted into the at least one boss portion 13.

In addition, the magnet member 51 and the head flange portion 71 that are in face-contact with each other may primarily block the composite material forming source 9 that flows into the inside of the insert nut 60 through a space between the flange bearing surface 55 and the magnet bearing surface 73.

Furthermore, the barrier grooves 91 are formed on the magnet bearing surface 73 of the head flange portion 71. The barrier grooves 91 may secondarily block the composite material forming source 9 flowing into the inside of the insert nut 60 through a space between the flange bearing surface 55 and the magnet bearing surface 73.

Next, when the composite material forming source 9 is cured, the insert nut 60 is fixed to the at least one boss portion 13. Then, the upper mold 23 of the press mold 20 is released from the lower mold 21.

Accordingly, while the insert nut 60 is fixed to the at least one boss portion 13, as the upper mold 23 is released from the lower mold 21, the mold pin assembly 30 is separated from the insert nut 60.

Accordingly, through a series of processes as described above, manufacturing of the plastic composite material panel 1 in which the insert nut 60 is inserted into the at least one boss portion 13 is completed.

According to the plastic composite material parts forming apparatus 100 according to an exemplary embodiment of the disclosure as described so far, as the head flange portion 71 of the insert nut 60 face-contacts the magnet member 51 of the mold pin assembly 30, adhesion between the mold pin assembly 30 and the insert nut 60 may be improved.

Accordingly, the plastic composite material parts forming apparatus 100 according to an exemplary embodiment of the disclosure may prevent the occurrence of a gap between the mold pin assembly 30 and the insert nut 60 by external force (for example, high pressure of the composite material forming source 9).

Furthermore, the sealing performance of the mold pin assembly 30 and the insert nut 60 may be improved by the head flange portion 71 and the magnet member 51 that are in face-contact with each other and the barrier grooves 91 formed on the magnet bearing surface 73 of the head flange portion 71.

That is, the plastic composite material parts forming apparatus 100 according to an exemplary embodiment of the disclosure may double-block the composite material forming source 9 flowing into the inside of the insert nut 60 through a gap between the flange bearing surface 55 of the magnet member 51 and the magnet bearing surface 73 of the head flange portion 71.

Therefore, the plastic composite material parts forming apparatus 100 according to an exemplary embodiment of the disclosure may solve the quality problem of the composite material forming source 9 being stuck in the insert nut 60, as in the related art.

Furthermore, the plastic composite material parts forming apparatus 100 according to an exemplary embodiment of the disclosure may eliminate an O-ring found in the related art.

As a result, the plastic composite material parts forming apparatus 100 according to an exemplary embodiment of the disclosure may solve the quality problem of the O-ring being caught in the insert nut 60, reduce the number of parts of the apparatus, and improve the operability of the apparatus.

Although exemplary embodiments of the disclosure have been described above, the disclosure is not limited thereto, and it is possible to carry out various modifications within the claim coverage, the description of the disclosure, and the accompanying drawings, and such modifications also fall within the scope of the disclosure.

The following reference identifiers may be used in connection with the drawings to describe various features of embodiments of the disclosure.

| | |
|---|---|
| 1: plastic composite material panel | 3: hood panel |
| 5: fastening member | 6: bolt |
| 7: vehicle body | 8: fiber material |
| 9: composite material forming source | 11: forming body portion |
| 13: boss portion | 15: insert |
| 20: press mold | 21: lower mold |
| 23: upper mold | 30: mold pin assembly |
| 31: core member | 33: magnet coupling groove |
| 41: insert pin | 51: magnet member |
| 53: pin coupling hole | 55: flange bearing surface |
| 60: insert nut | 61: fastening groove |
| 71: head flange portion | 73: magnet bearing surface |
| 81: nut body portion | 91: barrier groove |
| 100: plastic composite material parts forming apparatus | |

What is claimed is:

1. A plastic composite material parts forming apparatus for forming a composite material forming source into a set shape, the apparatus comprising:
   a press mold;
   a mold pin assembly mounted on the press mold; and
   an insert nut detachably attached to the mold pin assembly to be inserted into the composite material forming source, the insert nut having a head flange portion capable of face-contacting the mold pin assembly;
   wherein the mold pin assembly comprises:
   a core member coupled to the press mold;
   an insert pin extending downwardly from the core member to be fitted into the insert nut; and
   a magnet member coupled to a lower surface of the core member with the insert pin at a center and having a flange bearing surface capable of face-contacting the head flange portion of a circular flange type.

2. The apparatus of claim 1, wherein the mold pin assembly is mounted on an upper mold of the press mold.

3. The apparatus of claim 1, wherein the head flange portion face-contacts the mold pin assembly by magnetic force.

4. The apparatus of claim 1, wherein the magnet member has a donut shape with a pin coupling hole capable of being coupled to the insert pin disposed in a center.

5. The apparatus of claim 1, wherein the insert nut comprises a nut body portion having an outer diameter DO that is smaller than an outer diameter D1 of the head flange portion and extending downwardly from a lower surface of the head flange portion.

6. The apparatus of claim 5, wherein the outer diameter D1 of the head flange portion is equal to or greater than an outer diameter D2 of the magnet member.

7. The apparatus of claim 6, wherein the head flange portion has a maximum forging processing value of 2.2 D0, and wherein the outer diameter D1 of the head flange portion, the outer diameter D0 of the nut body portion, and the maximum forging processing value of the head flange portion satisfy D1=2.2 D0.

8. The apparatus of claim 5, wherein a connection angle of the lower surface of the head flange portion and the nut body portion is in a range from 10° to 35°.

9. The apparatus of claim 1, wherein the apparatus molds a plastic composite material panel into which the insert nut is inserted, and wherein the plastic composite material panel comprises a hood panel.

10. A plastic composite material parts forming apparatus for forming a composite material forming source into a set shape, the apparatus comprising:

a press mold;

a mold pin assembly mounted on the press mold; and an insert nut detachably attached to the mold pin assembly to be inserted into the composite material forming source, the insert nut comprising:

a head flange portion configured to face-contact the mold pin assembly; and a plurality of barrier grooves disposed on an upper surface of the head flange portion of a circular flange type, wherein the mold pin assembly comprises:

a core member coupled to the press mold;

an insert pin extending downwardly from the core member to be fitted into the insert nut; and a magnet member coupled to a lower surface of the core member with the insert pin at a center and having a flange bearing surface configured to face-contact the head flange portion of the circular flange type.

11. The apparatus of claim 10, wherein the barrier grooves are disposed from an inner edge to an outer edge of the head flange portion and are disposed in a concentric circle shape.

12. The apparatus of claim 10, wherein the barrier grooves are disposed from an inner edge to an outer edge of the head flange portion and are disposed in a wave shape in a radial direction.

13. The apparatus of claim 10, wherein the apparatus molds a plastic composite material panel into which the insert nut is inserted, and wherein the plastic composite material panel comprises a hood panel.

14. The apparatus of claim 10, wherein:

the press mold comprises an upper mold and a lower mold;

the mold pin assembly is mounted on the upper mold of the press mold; and the composite material forming source is disposed on the lower mold of the press mold.

15. The apparatus of claim 10, wherein the head flange portion face-contacts the mold pin assembly by magnetic force.

16. The apparatus of claim 10, wherein the insert nut comprises a nut body portion extending downwardly from a lower surface of the head flange portion and having an outer diameter D0 that is smaller than an outer diameter D1 of the head flange portion.

17. The apparatus of claim 16, wherein the outer diameter D1 of the head flange portion is equal to or greater than an outer diameter D2 of the magnet member.

18. The apparatus of claim 17, wherein the head flange portion has a maximum forging processing value of 2.2 D0, and wherein the outer diameter D1 of the head flange portion, the outer diameter Do of the nut body portion, and the maximum forging processing value of the head flange portion satisfy D1=2.2 D0.

\* \* \* \* \*